March 4, 1952
H. MILEY
2,587,639
ROTARY KILN FOR THE RECOVERY OF ACID VALUES
Filed Aug. 12, 1947
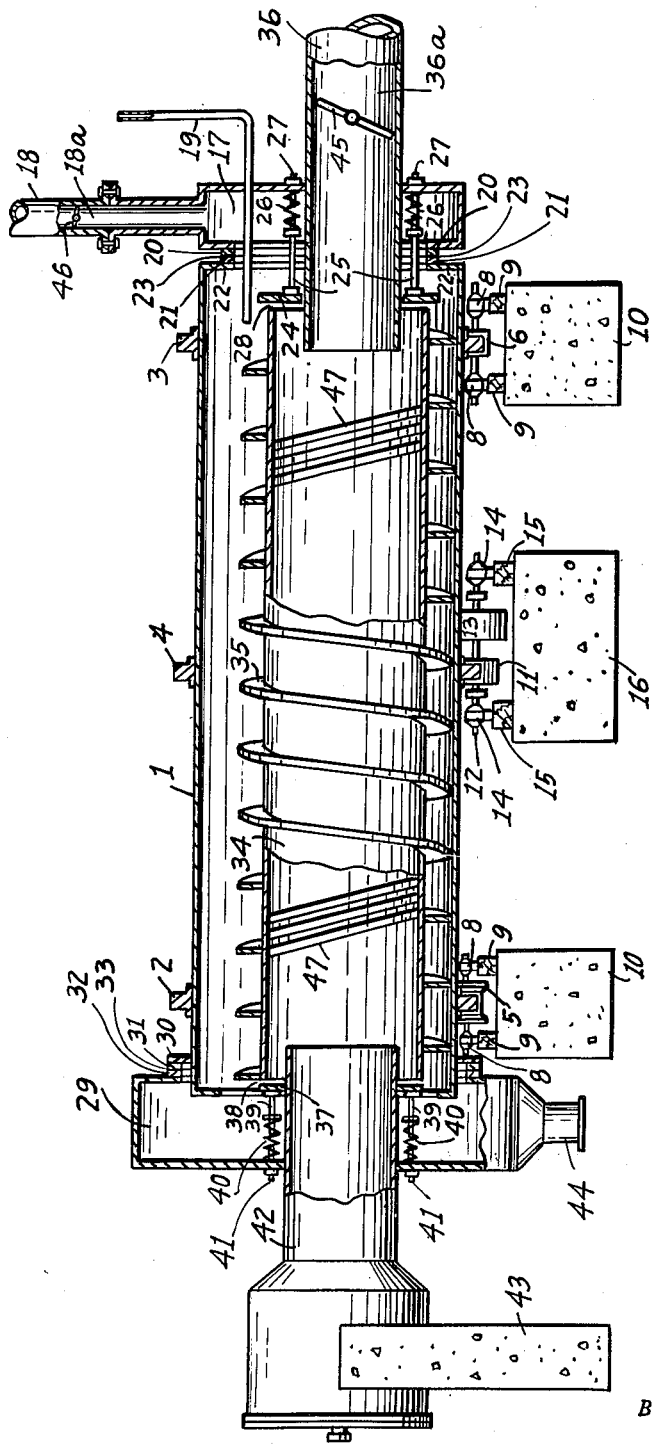
INVENTOR.
Hunter Miley
BY Burgess & Dinklage
Attorneys Patented Mar. 4, 1952

2,587,639

UNITED STATES PATENT OFFICE 2,587,639

ROTARY KILN FOR THE RECOVERY OF ACID VALUES

Hunter Miley, Petrolia, Pa., assignor to L. Sonneborn Sons, Inc., a corporation of Delaware Application August 12, 1947, Serial No. 768,112

8 Claims. (Cl. 23—279)

This invention relates to new and useful improvements in rotary kilns for the recovery of acid values from petroleum refining sulphuric acid sludges.

Conventional refining of petroleum hydrocarbons includes treatment with sulphuric acid either as such or in the form of fuming sulfuric acid or $SO_3$. Such treatment results in the formation of acid sludges which are essentially composed of sulfuric acid, sulfonates and hydrocarbon material. Large quantities of these acid sludges are produced in the oil industry and the recovery of sulfuric acid values therefrom presents a major problem.

Petroleum refining sulfuric acid sludges when heated to temperatures in excess of 500° F. are substantially decomposed into gaseous decomposition products comprising $SO_2$, water and oil vapors and a carbonaceous residual material usually referred to as coke. Various methods have been proposed in the past for the recovery of acid values from these and similar sludges utilizing this thermal decomposition. One such method involves the use of rotary kilns and decomposition of the sludge by direct contact with hot combustion gases usually in a counter-current arrangement within the kiln. The decomposing sludge passes through three main decomposition phases, i. e., liquid, semi-liquid and finally solid residual coke. In going through the semi-liquid stage, large balls of gummy material like big masses of dough are formed which must be broken up, kneaded and mixed to keep the kiln from being clogged and to assure satisfactory decomposition. This is usually accomplished by steel rods or bars that are lifted and dropped on the material within the kiln as the same revolves. Frequent renewals of the kiln bars or rods due to the corrosive action of the sludge is necessary. Furthermore, the pounding resulting from the action of these rods or bars necessitates the frequent repair and renewal of the kiln linings. Still further the use of the hot decomposition gases in the thermal decomposition of the sludge entails a considerable dilution of the $SO_2$ gas mixture issuing from the kiln. For the latter reason the application of the rotary kiln method is limited to the processing of acid sludges low in oil content since a high oil content produces a relatively large volume of combustion gases which render the $SO_2$ bearing vapors too dilute for economical conversion to $H_2SO_4$.

One object of the invention comprises inter alia an improvement in rotary kilns of the hitherto used types in which the disadvantages of the pounding action of rods or bars as hitherto used, is substantially eliminated.

Another object of the invention comprises an improvement in rotary kilns in which the thermal decomposition is carried out substantially avoiding undesirable dilution of $SO_2$-bearing decomposition gases from the kiln.

The foregoing and still further objects of the invention will be more fully understood from the following description read in conjunction with the accompanying drawing representing a side view of a preferred embodiment of the invention with parts cut away and parts in cross-section.

A rotary kiln shell 1 is substantially horizontally disposed and is provided with outer guide rings 2 and 3 and centrally located gear toothed guide ring 4. Guide rings 2 and 3 are slidably engaged by U-shaped guides 5 and 6 respectively, each being supported by way of guide supports 8 and blocks 9 resting on concrete foundation block 10. The toothed central guide ring 4 is engaged by the gear 11 driven by shaft 12 through pulley 13 by a motor (not shown). Shaft 12 rests in bearings 14 secured to blocks 15 which rest on the central foundation block 16. A substantially stationary gas hood 17 is mounted at one end of the rotary kiln shell 1 and is provided with a gas take-off 18. Acid sludge feed 19 passes through gas hood 17 into the interior of kiln shell 1. Friction rings 20 and 21 are secured to the gas hood 17 and the flange 22 of shell 1 to establish therebetween the friction joint 23.

A coke discharge hood 29 is provided at the end of the kiln away from the sludge feed 19. Flange member 30 carried by the exterior of the kiln shell 1 is secured to friction ring 31. A friction ring 32 is carried by the coke discharge hood 29 and the friction rings 31 and 32 establish therebetween a friction fit 33. The coke discharge hood 29 is also mounted substantially stationary.

A roller 34 provided with a helix 35 is loosely positioned within the rotary kiln shell 1 to rest with the helix on the inner surface thereof. A closure plate 24 is provided at the gas hood end of the kiln carrying rods 25 secured to springs 26 resting against the interior or gas hood 17 guided by way of the bolts 27. Closure plate 24 provides at 28 a friction closure, for the interior of roller 34. Heating gas outlet 36 extends through gas take-off hood 17 and closure 24 into the interior of the helicoid roller 34. A substantially stationary friction closure 37 is provided at the coke discharge end of the kiln. It defines closure friction surface 38 with the roller 34. Rods 39 secured to springs 40 passing to coke discharge hood 29 carrying the spring guide rods 41 press friction closure 37 against its end of the helicoid roller 34. A heating gas inlet 42 suitably supported on, for instance, concrete block 43 extends through coke discharge hood 29 and closure 37 into the interior of the helicoid roller 34.

In the practical operation of the invention the kiln shell 1 is rotated by means of pulley 13, shaft 12, gear 11 and toothed guide ring 4. Acid sludge is passed through the feed pipe 19 into the interior of the rotating kiln shell 1. A suitable heating medium, such as hot air combustion gases or the like, is passed through the heating gas inlet 42 into the interior of the helicoid roller 34 and out through the heating gas outlet 36. Through heat exchange within the helicoid roller the same heats up and transmits its heat to the acid sludge, thermally decomposing the same. The thermal decomposition of the acid sludge progresses gradually and as the rotary kiln shell 1 rotates, for instance, in a clockwise direction (viewed from the coke discharge end) the friction between the helix 35 and the rotating inner surface of shell 1 and/or sludge material in various stages of decomposition will cause the helicoid roller to rotate in the same direction. The helix then acts essentially to feed sludge material and/or decomposed sludge material forward towards the coke discharge end. At the same time it has a kneading and mixing effect and a breaking up effect upon any large masses of more-or-less solid decomposition materials formed or baked onto the shell. Thus as the heating gases move from the coke discharge to the gas take-off, the sludge material passes from the gas take-off end to the coke discharge end, being in this counter-current arrangement gradually more and more decomposed as it is progressively moved forward by the helix on the helicoid roller.

Though the helicoid roller 34 is substantially loosely positioned within the shell 1, it is substantially confined in longitudinal or axial movement by the closures 24 and 37 respectively. The springs 26 and 40 hold the closures in frictional engagement position with the roller ends, thus essentially serving as spacing means for each end of the helicoid roller as well as permitting longitudinal roller expansion caused by the heat. The continuously broken up solid decomposition products are finally discharged into the coke discharge hood 29 and are taken off through the outlet 44. The SO$_2$-bearing decomposition gases pass out through the gas hood 17 and the gas take-off 18. Though the frictional fits at 28 and 38 between the closures at the respective ends of the helicoid roller will in most cases suffice to prevent undue leakage of heating medium, such as combustion gases from the interior of the helicoid roller into the interior of the rotary kiln shell 1, or the leakage of SO$_2$-bearing decomposition gases from the interior of the kiln shell 1 into the interior of the helicoid roller 34, I find it advisable to provide suitable means to maintain a balanced vacuum within the system. Thus, for instance, an automatically controlled valve such as the butterfly valve 45 in heating gas outlet 36 and the butterfly valve 46 in gas take-off 18, may be provided. It is then possible to maintain a suitable pressure differential as between the interior of the helicoid roller 34 and the portion 36-a of the outlet 36 on the one hand and between the interior of rotary shell 1 and the portion 18-a of gas take-off 18. Thus, if for instance the pressure in part 36-a is less than that obtaining in the interior of shell 1, the preferential gas flow will be through the outlet 36 with a minimum of leakage at 28 and 38. If then the pressure in gas take-off portion 18-a is lower than the pressure inside the helicoid roller 34, the preferential discharge of decomposition gases will be through the gas take-off 18 and practically no leakage into the interior of helicoid roller 34 will occur at the friction joints 28 and 38.

Within the preferred embodiment of my invention I find it of advantage to provide the interior of the helicoid roller with suitable means to facilitate the heat exchange between the heating medium and the walls of the helicoid roller 34. Thus, for instance, suitable heat exchange fins 47 may be provided. In the drawings, for the sake of clarity only some of these are shown. I find it of advantage to arrange the same on the interior walls of the helicoid roller 34 substantially in the nature of a screw or thread angled in a direction substantially opposite to that of the helix.

Broadly speaking, the invention essentially embraces in a rotary kiln of the horizontally disposed type for the recovery of acid values from sulfuric acid sludges and having a rotatable kiln shell, a gas take-off from and sludge feed into said shell, the improvement which comprises a roller substantially loosely positioned within said shell, and a helix provided on the circumference of said roller, said roller resting with said helix on the inner surface of said shell and being substantially confined against appreciable longitudinal movement, the decomposition kiln so described is used in a method for recovery of acid values set forth in my copending application Serial No. 768,113, filed August 12, 1947.

When using the improvement in accordance with the invention the SO$_2$-bearing decomposition gases issuing from the gas take-off 18 are subjected in accordance with conventional practice to a water condensation step which will effectively remove therefrom substantially all condensable matter such as water and vaporized hydrocarbon material. The gas issuing from the condensation is substantially free from undesirable combustion gas diluents and contains a high concentration, sometimes as high as 98% SO$_2$.

The foregoing description is for purposes of illustration and not of limitation and it is therefore my intention that the invention be limited only by the appended claim or their equivalents wherein I have endeavored to claim broadly all inherent novelty.

I claim:

1. In a rotary kiln of the horizontally disposed type for the recovery of acid values from sulfuric acid sludges and having a rotatable kiln shell, a gas take-off from and sludge feed into said shell, the improvement which comprises a substantially hollow roller substantially loosely positioned within said shell, a helix provided on the circumference of said roller, said roller resting with said helix on the inner surface of said shell and being substantially confined against appreciable longitudinal movement and the interior of said roller being substantially closed against the interior of said shell, and means for passing a heating gas through said roller in heat exchange relation therewith.

2. Improvement according to claim 1 in which said roller carries on its inside means for facilitating heat exchange between said heating gas and the roller walls.

3. Improvement according to claim 1 in which the heating gas inlet is at the coke discharge end of the kiln and the heating gas outlet is at the sludge feed end.

4. Improvement according to claim 3 in which the interior of said roller is provided with heat exchange fins.

5. In a rotary kiln of the horizontally disposed type for the recovery of acid values from sulfuric acid sludges and having a rotatable kiln shell, a gas take-off from and sludge feed into said shell, the improvement which comprises a substantially hollow roller substantially loosely positioned within said shell, a helix provided on the circumference of said roller, said roller resting with said helix on the inner surface of said shell, a friction closure at each end of said roller and each held against its roller end by spring force, a heating gas inlet through one of said closures into said roller at the roller end removed from said sludge feed, and a heating gas outlet through the other said closure out of said roller.

6. Improvement according to claim 5 in which the interior of said roller is provided with heat exchange fins.

7. Improvement according to claim 5 in which there are additionally provided means in said gas take-off and in said heating gas outlet for substantially maintaining a balanced vacuum in each to substantially avoid gas leakage between the interior of said shell and the interior of said roller.

8. Improvement according to claim 7 in which the interior of said roller is provided with heat exchange fins extending in screw fashion angled in a direction substantially opposite to that of said helix.

HUNTER MILEY.

REFERENCES CITED

The following references are of record in the file of this patent:

UNITED STATES PATENTS

| Number | Name | Date |
|---|---|---|
| 1,717,786 | Clayton-Kennedy | June 18, 1929 |
| 2,422,989 | Skoog | June 24, 1947 |